United States Patent
Caldwell

[19]

[11] Patent Number: 5,911,556
[45] Date of Patent: Jun. 15, 1999

[54] ALL-TERRAIN VEHICLE DEER CADDY

[76] Inventor: Thomas Marion Caldwell, Route 1, Box 199-1A, Winona, Miss. 38967

[21] Appl. No.: 08/903,610

[22] Filed: Jul. 31, 1997

[51] Int. Cl.⁶ ........................................................ B60R 9/00
[52] U.S. Cl. ............................ 414/462; 224/401; 224/921
[58] Field of Search .................... 414/462, 540; 224/401, 410, 921

[56]    References Cited

U.S. PATENT DOCUMENTS

| | | | |
|---|---|---|---|
| 4,176,771 | 12/1979 | Dubroc, Sr. ................................ | 224/39 |
| 4,696,374 | 9/1987 | Hale ....................................... | 182/127 |
| 4,806,063 | 2/1989 | York ....................................... | 414/462 |
| 5,645,292 | 7/1997 | McWilliams et al. ..................... | 280/494 |
| 5,662,451 | 9/1997 | Muzzi et al. ............................. | 414/462 |
| 5,707,072 | 1/1998 | Hopper .................................... | 290/491.5 |

*Primary Examiner*—David A. Bucci
*Assistant Examiner*—Douglas Hess

[57]    ABSTRACT

The combination, with an ATV, of a lift comprised of two arms and a back bracket being pivotally attached to the ATV and a lift leg with a positive stop spade point at the forward end being mounted inside a center bracket that is pivotally attached to the arms, may be lowered to the ground to receive a load; and, with forward movement of the ATV, the load will be lifted and will slide down against the ATV back rack. After the load is moved upon the ATV back rack, the lift is then set in the retracted position and locked up to the ATV back rack by means of angle brackets attached to the ATV back rack and pins. The locked up position readies the lilt to receive and transport cargo.

3 Claims, 3 Drawing Sheets

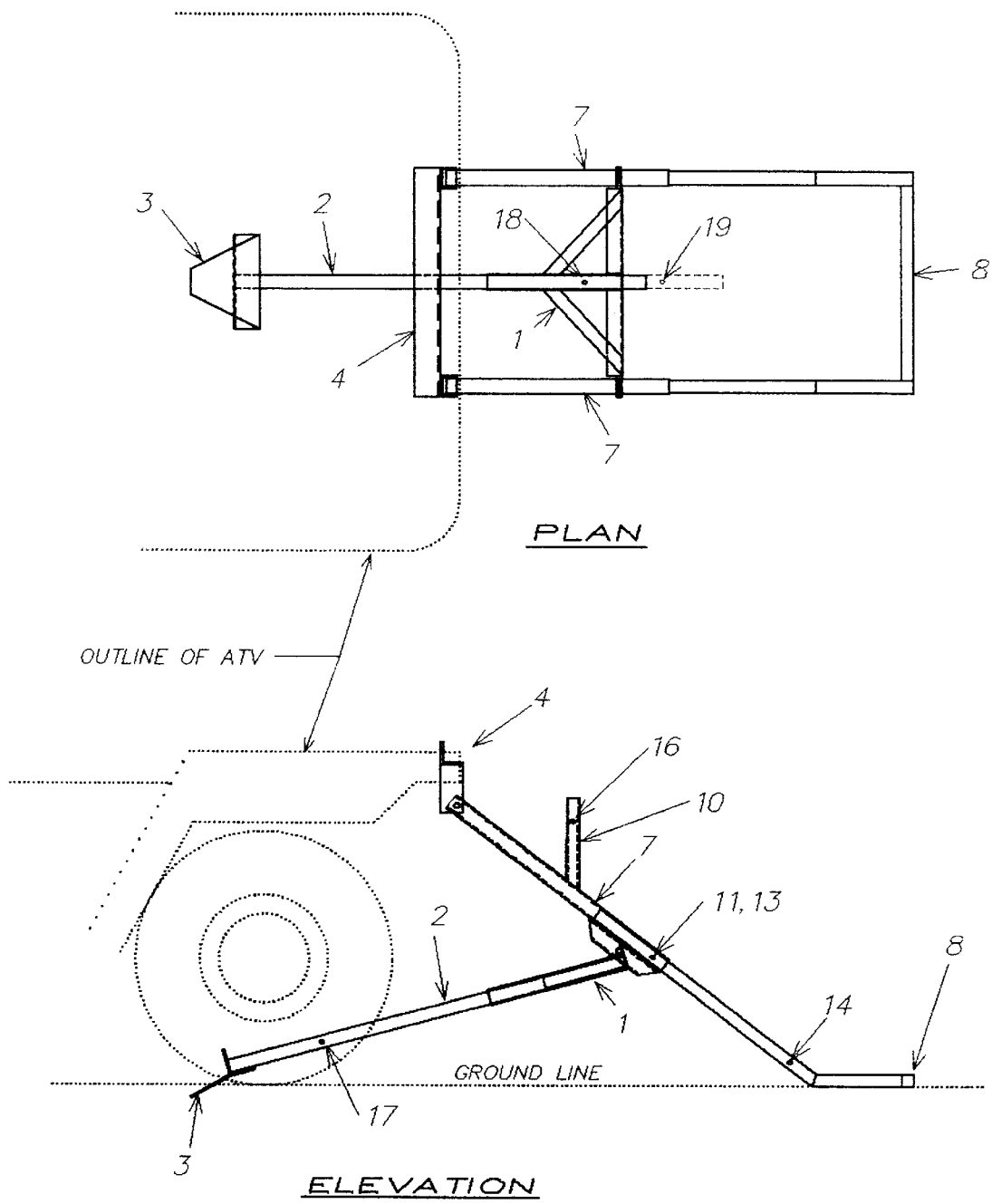
FIG. 1        DOWN POSITION

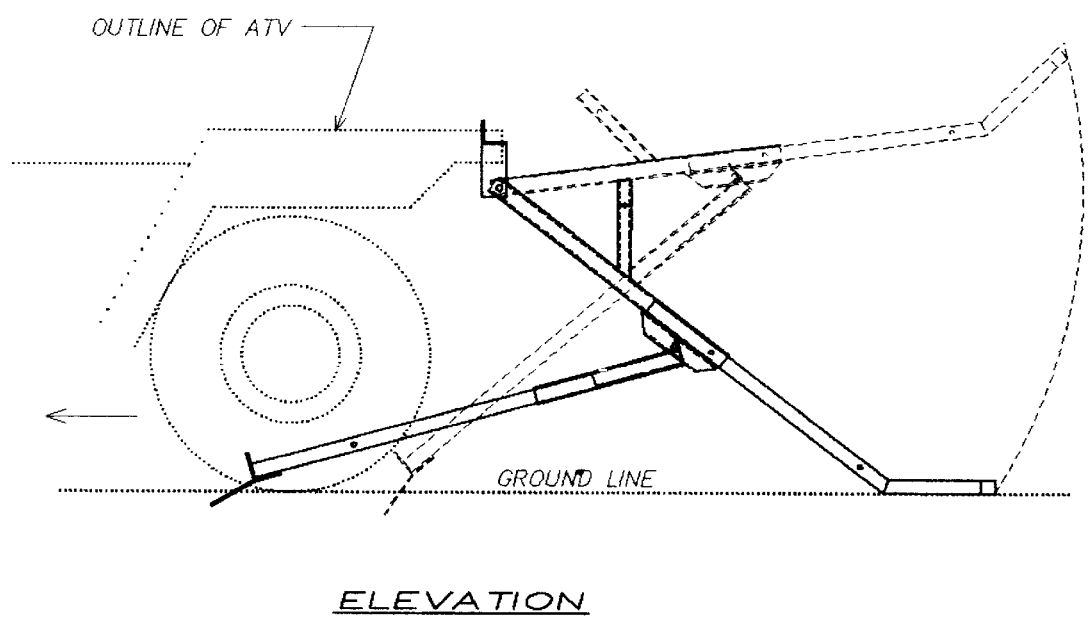
FIG. 1A   MOVEMENT

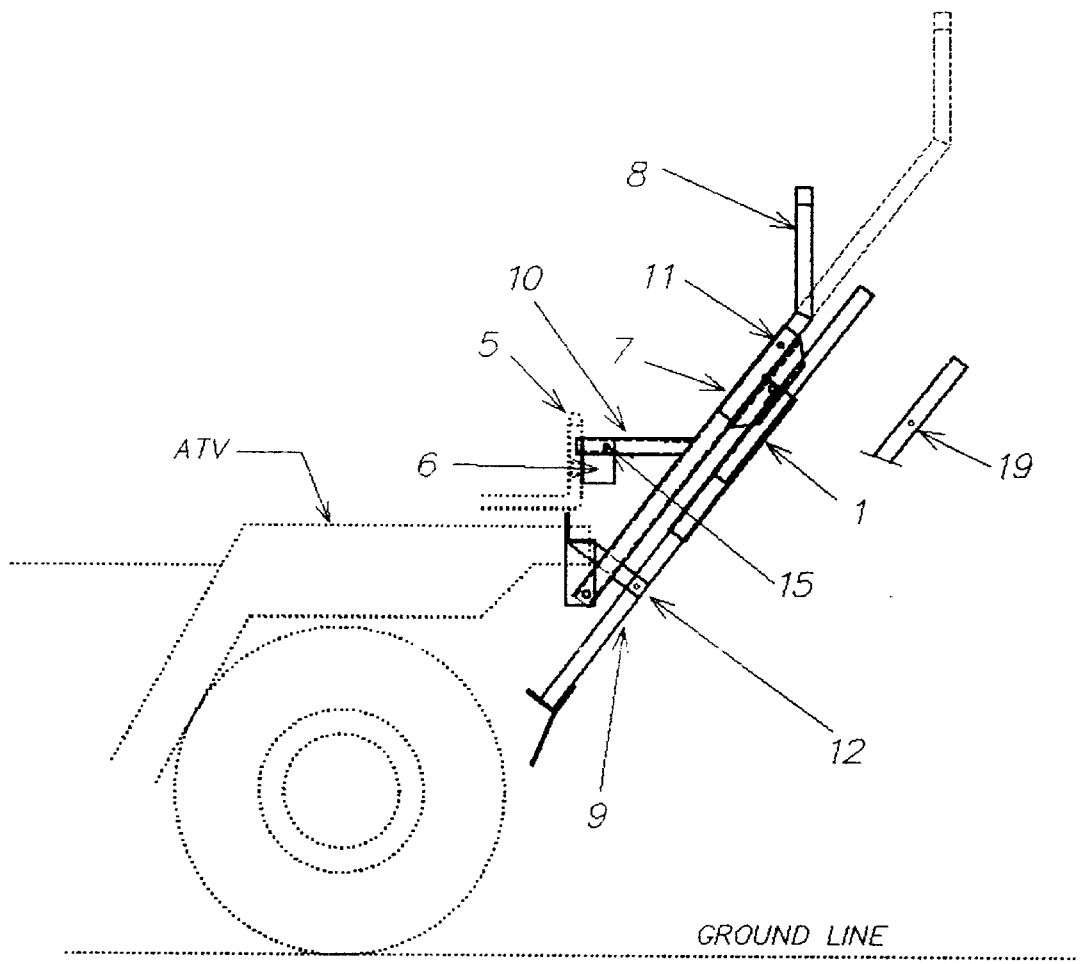
FIG. 2     UP POSITION 5,911,556

ALL-TERRAIN VEHICLE DEER CADDY

BACKGROUND OF THE INVENTION

1. Field of the Invention

The present invention relates to a lift that can be used to lift game animals and haul cargo. The lift is mountable to an all-terrain vehicle.

2. Description of the Prior Art

When a hunter harvests a big game animal, it must be moved from the woods back to camp as quickly as possible for cleaning in order to preserve the meat. A large game animal is extremely difficult for one man to lift onto an all-terrain vehicle. The lone hunter must go for help. Consequently, the delay in getting the animal dressed could lead to spoilage of the meat.

For the above reasons, a lift that attaches to the hunter's all-terrain vehicle and is available at the actual hunting site is very desirable. Prior art lifts are adapted for use with horse drawn wagons that were used in open fields for lifting corn shocks. The lift of the present invention has been designed to be easily transportable by and mountable to an all-terrain vehicle (ATV). ATVs are highly mobile vehicles that can transport the hunter to the very site where game is harvested. In recent years, ATVs have come into widespread use by hunters and other outdoor enthusiasts. Therefore, the lift of the present invention in combination with the widely available ATV can bring about the realization of a game lift that is readily available at the site where game is harvested. In addition to lifting the game onto the ATV, when pinned up for transport, the lift creates a cradle where other gear can be secured for transport. U.S. Pat. No. 538,627, issued to Shanks shows a corn shock loader pivotally attached to a wagon. Shanks does not show telescoping design of the loader, and aggressively angled point with a depth control stop on the lift leg, and a pinned up position that creates a cradle for transporting cargo.

The invention and patent above is not seen to describe the instant invention as claimed.

SUMMARY OF THE INVENTION

The present invention is directed to a lift for loading game animals. The lift has two pivotally attached parallel arms with a back cradle that telescopes inside the two arms. A pivotally attached center bracket is mounted between and beneath the arms. A lift leg is slidably supported within a sleeve member of the center bracket. At the forward end of the lift leg is an aggressively angled spade point with a stop plate.

The lift is attached to an all-terrain vehicle by a mounting bracket that attaches to the rear cargo rack supports. The mounting bracket has rigidly attached hinge brackets through which the parallel arms are attached. The mounting bracket also has a downwardly extended stud to which the lift leg is pinned and held during travel.

The invention also includes two angle brackets that attach to the bottom rail of the rear cargo rack. Studs on top of the arms pin to the angle brackets to support the lift during travel.

Accordingly, it is the principal object of the present invention to provide a lift for loading game animals in the field.

It is a further object of the present invention to provide a lift for loading game animals which can be conveniently carried on an ATV.

Still another object of the invention is to provide a cradle on which cargo may be hauled.

It is an object of the invention to provide improved elements and arrangements thereof in an apparatus for the purposes described which is inexpensive, dependable and fully effective in accomplishing its intended purposes.

These and other objects of the present invention will become apparent upon further review of the following specifications and drawings.

BRIEF DESCRIPTION OF SEVERAL VIEWS OF THE DRAWINGS

The plan is a top view of the complete lift. FIG. 1 is a side elevation view showing the application of the lift to an all-terrain vehicle and the position of the parts when the lift is extended and lowered to the ground for lifting. FIG. 1A is a side elevation view showing the lift moving through the lifting cycle.

Elevation FIG. 2 shows the lift in the locked up and retracted position. This position is used for travel and cargo hauling.

DETAILED DESCRIPTION OF THE INVENTION

Referring now to the drawings, the lift is comprised of a mounting bracket 4, which attaches to the ATV back rack supports with two U-bolts. Two arms 7, are pivotally attached to the mounting bracket 4. The back bracket 8, is so constructed as to fit inside the arms 7, and have telescoping elongating and retracting characteristics. The back bracket 8 is held in the retracted position by placing pins through holes 11 and holes 14. For the extended position, holes 11 and holes 13, which are holes in back bracket 8, are pinned. The lift leg 2, being slidably supported and held laterally by a sleeve member of the center bracket 1, is pivotally attached to the arms 7. The forward end of the lift leg 2 is provided with an angled positive stop spade point 3. For lifting action, the lift leg is extended down and held in place by placing a pin through hole 19 and hole 18. For travel, the lift leg 2 is moved up through center bracket 1, placed in the leg hold bracket 9, and pinned through hole 12 and hole 17. Two angle brackets 6 are attached to the ATV back rack 5 with U-bolts. Achieve the locked up position by pivoting the lift upward until hole 15 of the angle bracket 6 aligns with hole 16 of the arm stud 10. Place pin through holes 15 and 16. To operate the lift, the lift leg 2 is removed from the leg hold bracket 9, extended down and pinned through holes 19 and 18. The back bracket 8 is extended out and pinned through holes 11 and 14. Remove the lock pins from holes 15 and 16. Position the lift leg point slightly forward of perpendicular; press the point 3 into the ground with one foot while pulling back and down on the back bracket 8. This action will roll the ATV backward and place the lift in the down position shown in FIG. 1. The load is placed across the horizontal end of the back bracket 8. Forward movement of the ATV pivots the lift upward as shown in FIG. 1A. The ATV is stopped when the lift reaches maximum height. The load slides down the incline to the back rack where it can easily be rolled onto the back rack. The lift is then returned to its locked up position as shown in FIG. 2 where it forms a cradle for transporting additional cargo.

It is to be understood that the present invention is not limited to the embodiments described above, but encompasses any and all embodiments within the scope of the following claims.

I claim:

1. A lift for loading game animals or other objects, said lift having an up position and a down position and for attaching to a rear rack of an all-terrain vehicle, said lift comprising:

a mounting bracket using two U-bolts for attaching said lift to a support for said all-terrain vehicle rear rack;

two arms pivotally attached to the mounting bracket;

a back bracket having substantially similar cross-section as said arms and mounting inside said arms;

a center bracket pivotally attached to said arms;

a lifting leg slidably supported within a sleeve member of said center bracket;

an angled point and depth controlled stop is attached to a forward end of said lifting leg; and two angle brackets for attaching to a bottom of said rear rack wherein the entire lift can be pinned and held in the up position.

2. The lift according to claim 1, wherein said back bracket is telescopingly mounted within said two arms.

3. The lift according to claim 1, pinned in the up position forms a cradle for transporting cargo.

* * * * *